(12) United States Patent
Schurz et al.

(10) Patent No.: US 11,951,825 B2
(45) Date of Patent: Apr. 9, 2024

(54) CHARGING CONNECTION DEVICE FOR A VEHICLE

(71) Applicant: Daimler AG, Stuttgart (DE)

(72) Inventors: Andreas Schurz, Aichelberg (DE); Robin Boeld, Goeppingen (DE)

(73) Assignee: Daimler AG, Stuttgart (DE)

( * ) Notice: Subject to any disclaimer, the term of this patent is extended or adjusted under 35 U.S.C. 154(b) by 371 days.

(21) Appl. No.: 17/424,751

(22) PCT Filed: Dec. 18, 2019

(86) PCT No.: PCT/EP2019/085929
§ 371 (c)(1),
(2) Date: Jul. 21, 2021

(87) PCT Pub. No.: WO2020/151886
PCT Pub. Date: Jul. 30, 2020

(65) Prior Publication Data
US 2022/0126684 A1    Apr. 28, 2022

(30) Foreign Application Priority Data
Jan. 22, 2019 (DE) ..................... 10 2019 000 462.0

(51) Int. Cl.
*B60K 15/05* (2006.01)
*B60L 53/16* (2019.01)
*H01R 13/453* (2006.01)

(52) U.S. Cl.
CPC ............. *B60K 15/05* (2013.01); *B60L 53/16* (2019.02); *H01R 13/4532* (2013.01);
(Continued)

(58) Field of Classification Search
CPC ........ H02G 3/12; H02G 3/14; H01R 2201/26; H01R 13/447; H01R 13/4532;
(Continued)

(56) References Cited

U.S. PATENT DOCUMENTS

| 5,501,607 A | 3/1996 | Yoshioka et al. |
| 7,988,453 B2 * | 8/2011 | Loo .......................... B60L 53/11 439/142 |

(Continued)

FOREIGN PATENT DOCUMENTS

| AU | 2008260418 A1 | 7/2009 |
| DE | 44 16 992 A1 | 11/1994 |

(Continued)

OTHER PUBLICATIONS

PCT/EP2019/085929, International Search Report dated Mar. 31, 2020 (Two (2) pages).

(Continued)

*Primary Examiner* — Anthony R Jimenez
(74) *Attorney, Agent, or Firm* — Crowell & Moring LLP

(57) ABSTRACT

A charging connection device for a vehicle includes a junction box disposed in a recess, a junction box cover flap, and a cover flap. The junction box cover flap and the cover flap are each pivotable into an open position and a closed position. The junction box cover flap covers the junction box in the closed position and the recess is coverable by the cover flap. When the cover flap is displaced from the open position into the closed position the cover flap entrains the junction box cover flap. The junction box cover flap has a first element of a junction box connecting device and the junction box or a component that defines the recess has a second element of the junction box connecting device. In the closed position of the junction box cover flap, the junction box cover flap is held magnetically releasably by the junction box connecting device.

8 Claims, 1 Drawing Sheet

(52) U.S. Cl.
CPC .............................. *B60K 2015/053* (2013.01); *B60K 2015/0538* (2013.01); *H01R 2201/26* (2013.01)

(58) Field of Classification Search
CPC ........................ H01R 13/5213; H01R 13/6397; H01R 12/00; H01R 12/50; H01R 12/65; H01R 12/70; H01R 12/7005; H01R 12/7011; H01R 12/7017; H01R 12/7035; H01R 13/00; H01R 13/10; H01R 13/11; H01R 13/111; H01R 13/5202; H01R 13/5205; H01R 4/00; H01R 4/183; H01R 4/22; H01R 9/00; H01R 9/03; H01R 9/16; H01R 9/223; H01R 9/24; E05Y 2900/534; B60K 2015/0422; B60K 2015/0435; B60K 2015/053; B60K 2015/0538; B60K 2015/0553; B60K 15/05; B60L 53/16; B62D 25/24; H01B 7/00; H01B 7/17; H01B 7/18; H01B 7/1805; H01B 7/185; H01B 7/186; H01B 7/28

See application file for complete search history.

(56) References Cited

U.S. PATENT DOCUMENTS 8,893,910 B2    11/2014   Batchelor
10,259,315 B2    4/2019   Jobst et al.

FOREIGN PATENT DOCUMENTS

| DE | 198 32 910 A1 | 1/1999 | |
|----|---------------|--------|---|
| DE | 10 2015 100 136 A1 | 7/2016 | |
| DE | 10 2015 214 713 A1 | 2/2017 | |
| DE | 10 2017 201 365 A1 | 8/2018 | |
| DE | 10 2018 001 924 A1 | 8/2018 | |
| EP | 0 115 644 A1 | 8/1984 | |
| EP | 0 630 074 A2 | 12/1994 | |
| EP | 3360211 B1 * | 6/2023 | .............. B60L 53/14 |

OTHER PUBLICATIONS

German-language German Office Action issued in German application No. 10 2019 000 462.0 dated Oct. 8, 2020 (Seven (7) pages).

* cited by examiner

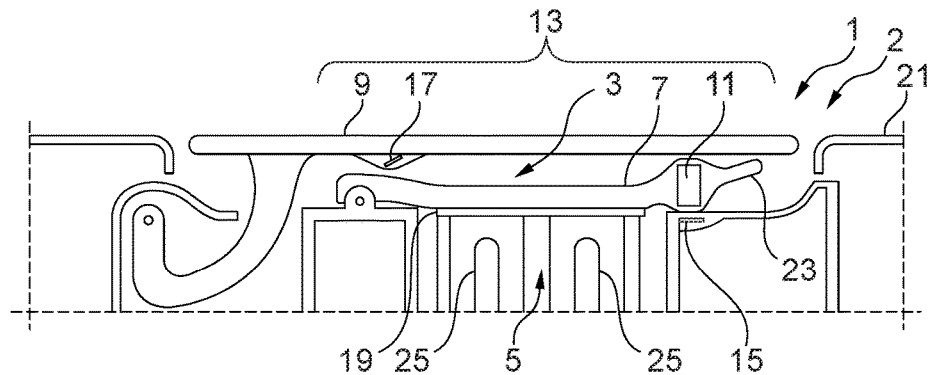
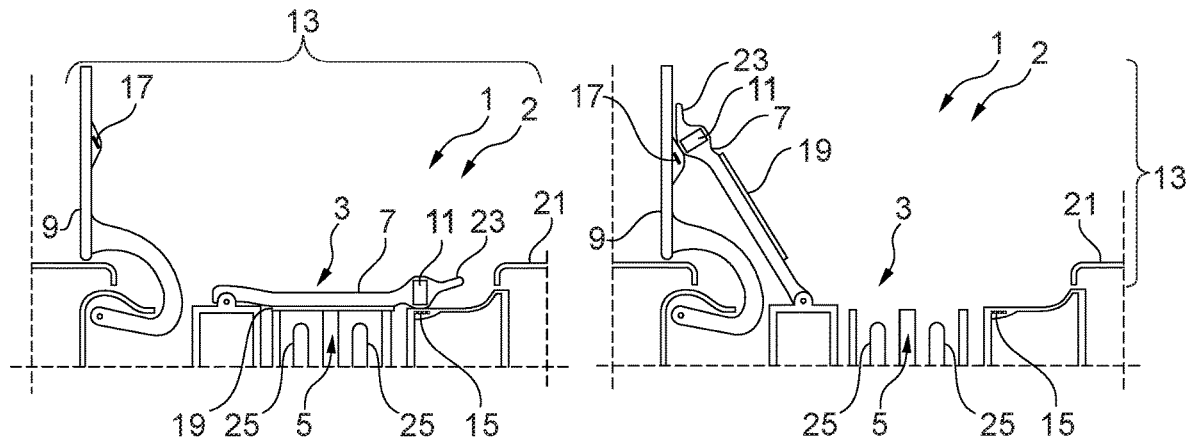
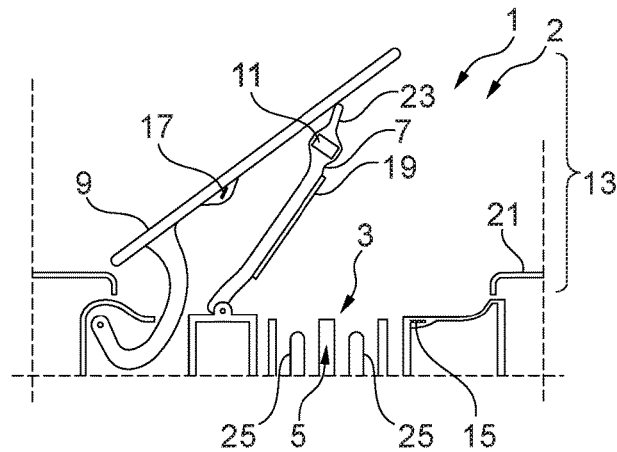

CHARGING CONNECTION DEVICE FOR A VEHICLE

BACKGROUND AND SUMMARY OF THE INVENTION

The invention relates to a charging connection device for a vehicle.

Charging connection devices of the type addressed here, sometimes also referred to as a charging socket, in particular HV charging socket, must be sealed against dust and water, in particular according to IP67. The critical region of the charging connection device is the plug contacts that the charging connection device has. It is known to provide corresponding flaps or plugs that cover the plug contacts of the charging connection device both before and after the charging process. In this respect, it is necessary for these flaps or plugs to be opened or removed manually before the charging process and closed or inserted again after the charging process. This is particularly problematic with regard to automatic systems.

In particular, in the case of motorized outer flaps, existing flaps or plugs must be operated manually when a charging plug is inserted into the charging connection device. The disadvantage of this is that, during a charging process carried out by a robot, a flap and, in particular, any existing plug of the charging connection device cannot be closed or reinserted and thus the plug contacts remain unprotected.

A charging connection device for a motor vehicle is known from DE 10 2017 201 365 A1, comprising a junction box arranged in a recess with a pivotable cover which can be detachably connected thereto and a pivotable cover flap which reversibly closes the recess, wherein the cover and the cover flap are pivotable between a closed position and an open position, wherein this cover, which is in the open position, is arranged in the pivot path of the cover flap, which is pivotable from the open position into the closed position by means of a motorized actuating means, and during the pivot movement of the cover flap is entrained by the latter for closing. This causes the problems mentioned above.

A device for closing an inlet of a motor vehicle tank emerges from EP 0 115 644 A1. The inlet has a flexible part which is fixed to a filling shell, which is in turn fixedly connected to a flap which is hinged to the body of the vehicle.

A generic charging connection device emerges from both DE 44 16 992 A1 and EP 0 630 0074 A2.

The object of the invention is thus to create a charging connection device for a vehicle as well as a vehicle, wherein the mentioned disadvantages do not occur.

The object is solved in particular by creating a charging connection device for a vehicle, comprising a junction box arranged in a recess, for example a depression or receiving space accessible from the outside of the body, as well as a pivotably arranged junction box cover flap and a pivotably arranged cover flap. It is provided in this case that the junction box cover flap and the cover flap can each be pivoted into an open position and into a closed position, wherein the junction box cover flap is set up to cover the junction box in the closed position, in particular to cover it in a watertight manner, wherein the cover flap is arranged and set up to cover the recess, in particular to cover it in a watertight manner. In this case, the junction box cover flap and the cover flap are arranged relative to one another in such a way that, when the cover flap and preferably the junction box cover flap are displaced from the respective open position into the respective closed position, the cover flap takes the junction box cover flap with it when it is closed, i.e., the junction box cover flap is also closed by the closing of the cover flap. Furthermore, the junction box cover flap comprises a first element of a junction box connection device and the junction box or the recess comprises a second element of the junction box connection device, wherein the first element and the second element are preferably opposite each other in a closed position of the junction box cover flap. The first element and the second element of the junction box connecting device are arranged and set up relative to each other in such a way that, in the closed position of the junction box cover flap, the junction box cover flap is held, in particular fixed, in a magnetically releasable manner by the junction box connecting device. The magnetic fixing of the junction box cover flap ensures in particular that a tight closure, in particular a watertight closure of the junction box, is achieved in a simple manner, wherein this can also be reproducibly and reliably opened again—without wear. Plug contacts, which are arranged in the junction box, are thus protected in the closed position and easily accessible in the open position. In particular, the advantage is achieved that, when the cover flap is closed automatically, the junction box cover flap is also closed and held magnetically in the closed position by the junction box connecting device. In other words, the plug contacts are protected.

Furthermore, it is provided that the cover flap has a third element of the junction box connecting device, wherein the third element of the cover flap and the first element of the junction box cover flap are arranged and set up relative to each other in such a way that, in the open position of the junction box cover flap and the cover flap, the junction box cover flap is held, in particular fixed, magnetically releasably on the cover flap by the junction box connecting device. In particular, this has the advantage that the junction box cover flap is held magnetically on the cover flap, such that it is achieved in a simple manner that the junction box cover flap does not interfere during a charging process.

According to a development of the invention, it is provided that one of the following combinations is selected:

a) if the first element consists of a magnetic material, the second element consists of a metallic material or a magnetic material with inverse polarity corresponding to the magnetic material of the first element, and optionally the optional third element consists of a metallic material or a magnetic material with inverse polarity corresponding to the magnetic material of the first element, or b) if the first element consists of a metallic material, the second element consists of a magnetic material, and optionally the third element also consists of a magnetic material.

In this way, magnetic holding, in particular fixing, is achieved in a simple manner.

According to a development of the invention, it is provided that the junction box cover has a sealing device on a side facing the junction box in a closed position, which preferably has rubber or consists of rubber. This exemplary embodiment has the advantage that a cover, in particular a waterproof cover, can be implemented in a simple manner.

According to a development of the invention, it is provided that the cover flap is designed to be displaceable motorically, in particular electromotively and/or pneumatically and/or hydraulically. An automatic opening or closing of the cover flap is hereby achievable.

According to a development of the invention, it is provided that the junction box cover flap is designed to be displaceable motorically, in particular electromotively and/or pneumatically and/or hydraulically. This has in particular the advantage that the junction box cover can be actuated automatically in a simple manner.

According to a development of the invention, it is provided that the junction box cover flap and the cover flap are pivotably arranged on the component defining the recess.

In accordance with a development of the invention, it is provided that a magnetic material is implemented or formed in the charging connection device by means of a correspondingly controllable, i.e., predeterminably controllable, electromagnet.

The object is also solved by creating a vehicle comprising a charging connection device according to the present invention. In connection with the vehicle, the advantages which have already been explained in connection with the charging connection device arise in particular.

According to a development of the invention, it is provided that the charging connection device is arranged in the region of an outer side, sometimes also referred to as an outer contour or outer skin, of the vehicle. This has the particular advantage that access to the junction box is possible in a simple manner, preferably without the vehicle having to be opened for this purpose.

The invention is explained in more detail below with reference to the drawings.

BRIEF DESCRIPTION OF THE DRAWINGS

FIG. 1 a first exemplary embodiment of the charging connection device, wherein the junction box cover flap as well as the cover flap are in the closed position;

FIG. 2 the exemplary embodiment of the charging connection device according to FIG. 1, wherein the cover flap is in an open position and the junction box cover flap is in a closed position;

FIG. 3 the exemplary embodiment of the charging connection device according to FIGS. 1 and 2, wherein the junction box cover flap and the cover flap are in an open position; and FIG. 4 the exemplary embodiment of the charging connection device according to FIGS. 1 to 3, wherein the junction box cover flap and the cover flap are each pivoted into the closed position.

DETAILED DESCRIPTION OF THE DRAWINGS

Identical reference numerals refer to identical or functionally identical parts in all figures.

FIGS. 1 and 2 show a charging connection device 1 for a vehicle 2, of which only a small part of an outer side 21, also referred to as an outer skin, is shown here. The charging connection device 1 comprises a junction box 5 arranged in a recess 3 accessible from the vehicle outer side 21 via an opening in the body exterior wall, as well as a pivotably arranged junction box cover flap 7 and a pivotably arranged cover flap 9. The junction box cover flap 7 and the cover flap 9 can each be pivoted into an open position and into a closed position. The junction box cover flap 7 is designed to cover the junction box 5 in the closed position, in particular to cover it in a watertight manner. Furthermore, the cover flap 9 is arranged and set up to cover the recess 3, in particular to cover it in a watertight manner.

The junction box cover flap 7 and the cover flap 9 are arranged relative to each other in such a way that, when the junction box cover flap 7 and the cover flap 9 are moved from the respective open position to the respective closed position, the cover flap 9 entrains the junction box cover flap 7 when closing, i.e., the junction box cover flap 7 is also closed by the closing of the cover flap 9.

The junction box cover flap 7 has a first element 11 of a junction box connecting device 13 and the junction box 5 or the recess 3 has a second element 15 of the junction box connecting device 13, wherein the first element 11 and the second element 15 are opposite each other in a closed position of the junction box cover flap, and wherein the first element 11 and the second element 15 of the junction box connecting device 13 are arranged and set up with respect to each other in such a way that, in the closed position of the junction box cover flap 7, the junction box cover flap 7 is held, in particular fixed, in a magnetically releasable manner by the junction box connecting device 13.

Here, it is preferably provided that the junction box cover flap 7 is pulled into the closed position by the magnetic force of the junction box connecting device 13, in particular of the magnetic force between the first element 11 and the second element 15 of the junction box connecting device 13, when the junction box cover flap 7 approaches an end position of the closed position.

In FIG. 3, it is shown that the cover flap 9 has a third element 17 of the junction box connecting device 13, wherein the third element 17 of the cover flap 9 and the first element 11 of the junction box cover flap 7 are arranged and set up relative to each other in such a way that, in the open position of the junction box cover flap 7—as shown in FIG. 3—and of the cover flap 9, the junction box cover flap 7 is held, in particular fixed, magnetically releasably on the cover flap 9 by the junction box connecting device 13.

Furthermore, it is preferably provided that one of the following combinations is selected:
a) if the first element 11 consists of a magnetic material, the second element 15 consists of a metallic material or a magnetic material with inverse polarity corresponding to the magnetic material of the first element 11, and optionally the optional third element consists of a metallic material or a magnetic material with inverse polarity corresponding to the magnetic material of the first element 11, or
b) if the first element 11 consists of a metallic material, the second element 15 consists of a magnetic material, and optionally also the optional third element 17 consists of a magnetic material.

Furthermore, it can be seen in particular from FIGS. 1 and 2 that the junction box cover flap 7 has, on a side facing the junction box 5 in a closed position, a sealing device 19 for liquid-tight sealing of the junction box 5, which preferably has rubber or similar or consists of rubber.

Furthermore, it is preferably provided that the cover flap 9 is designed to be displaceable motorically, in particular electromotively and/or pneumatically and/or hydraulically.

Furthermore, it is preferably provided that the junction box cover flap 7 is designed to be displaceable motorically, in particular electromotively and/or pneumatically and/or hydraulically.

Furthermore, it is preferably provided that the junction box cover flap 7 and the cover flap 9 are pivotably arranged on the component defining the recess 3. Their respective pivot axes are aligned parallel to each other. The respective pivot bearing or joint for the pivotable displacement of the junction box cover flap 7 or cover flap 9 is arranged in a fixed position on the vehicle body.

It can be seen from the figures—as already mentioned above—that the charging connection device 1 is arranged in the region of the vehicle outer side 21, wherein the junction box 5 is arranged offset inwards with respect to the body shell and is accessible from the outside via a recess in the body shell, provided that the cover flap 9 is arranged in its open position shown in FIGS. 2 and 3.

In particular, it can be seen from FIG. 3 that, when the cover flap 9 is open, the inner junction box cover flap 7 can easily be opened and struck against the cover flap 9 against a magnetic resistance of the junction box connecting device 13 by means of a handle 23 arranged on the junction box cover flap 7, such that magnetic holding is implemented by means of the junction box connecting device 13.

Furthermore, it can be seen from all the figures that two plug contacts 25 are arranged in each junction box 5.

The invention claimed is:

1. A charging connection device (1) for a vehicle (2), comprising:
    a junction box (5) disposed in a recess (3);
    a junction box cover flap (7); and
    a cover flap (9);
    wherein the junction box cover flap (7) and the cover flap (9) are each pivotable into an open position and a closed position;
    wherein the junction box cover flap (7) covers the junction box (5) in the closed position;
    wherein the recess (3) is coverable by the cover flap (9);
    wherein the junction box cover flap (7) and the cover flap (9) are disposed relative to each other such that when the cover flap (9) is displaced from the open position into the closed position the cover flap (9) entrains the junction box cover flap (7);
    wherein the junction box cover flap (7) has a first element (11) of a junction box connecting device (13) and the junction box (5) or a component that defines the recess (3) has a second element (15) of the junction box connecting device (13);
    wherein the first element (11) and the second element (15) of the junction box connecting device (13) are disposed relative to each other such that in the closed position of the junction box cover flap (7) the junction box cover flap (7) is held magnetically releasable by the junction box connecting device (13);
    wherein the cover flap (9) has a third element (17) of the junction box connecting device (13), wherein the third element (17) of the cover flap (9) and the first element (11) of the junction box cover flap (7) are disposed relative to each other such that in the open position of the junction box cover flap (7) and the cover flap (9) the junction box cover flap (7) is held magnetically releasable on the cover flap (9) by the junction box connecting device (13).

2. The charging connection device according to claim 1, wherein:
    a) the first element (11) consists of a magnetic material and the second element (15) consists of a metallic material or a magnetic material with inverse polarity corresponding to the magnetic material of the first element (11); or
    b) the first element (11) consists of a metallic material, the second element (15) consists of a magnetic material, and the third element (17) consists of a magnetic material.

3. The charging connection device according to claim 1, wherein the cover flap (9) is displaceable motorically and/or pneumatically and/or hydraulically.

4. The charging connection device according to claim 1, wherein the junction box cover flap (7) and the cover flap (9) are pivotably disposed on the component that defines the recess (3).

5. The charging connection device according to claim 1, wherein the junction box cover flap (7) has a sealing device (19) on a side facing the junction box (5) in the closed position.

6. The charging connection device according to claim 5, wherein the sealing device (19) has rubber or consists of rubber.

7. A vehicle (2), comprising:
    the charging connection device (1) according to claim 1.

8. The vehicle according to claim 7, wherein the charging connection device (1) is disposed in a region of an outer side (21) of the vehicle (2).

* * * * *